US 8,457,051 B2

(12) United States Patent
Luo

(10) Patent No.: US 8,457,051 B2
(45) Date of Patent: Jun. 4, 2013

(54) METHOD, DEVICE AND SYSTEM FOR DIFFERENTIATING OPERATORS IN ONE NETWORK

(75) Inventor: Xiong Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 339 days.

(21) Appl. No.: 12/775,697

(22) Filed: May 7, 2010

(65) Prior Publication Data

US 2010/0220659 A1 Sep. 2, 2010

Related U.S. Application Data

(63) Continuation of application No. PCT/CN2008/072938, filed on Nov. 4, 2008.

(30) Foreign Application Priority Data

Nov. 7, 2007 (CN) .......................... 2007 1 0166106

(51) Int. Cl.
*H04W 4/00* (2009.01)
*H04J 3/24* (2006.01)

(52) U.S. Cl.
USPC ........... 370/328; 370/330; 370/347; 370/422; 370/466; 370/474; 455/426.1; 455/450; 455/453; 455/466; 455/515

(58) Field of Classification Search
USPC ............................. 370/328–463; 455/428–517
See application file for complete search history.

(56) References Cited

U.S. PATENT DOCUMENTS

| 6,980,820 | B2 * | 12/2005 | Sinnarajah et al. | 455/515 |
| 6,985,462 | B2 * | 1/2006 | Hosein | 370/329 |
| 7,191,231 | B2 * | 3/2007 | Miernik et al. | 709/225 |
| 7,327,706 | B2 * | 2/2008 | Joshi et al. | 370/331 |
| 7,483,411 | B2 * | 1/2009 | Weinstein et al. | 370/338 |
| 7,590,092 | B2 * | 9/2009 | Milton et al. | 370/331 |
| 7,620,399 | B2 * | 11/2009 | Kim et al. | 455/436 |

(Continued)

FOREIGN PATENT DOCUMENTS

| CN | 1342005 A | 3/2002 |
| CN | 1756419 A | 4/2006 |
| CN | 1902971 A | 1/2007 |

OTHER PUBLICATIONS

"3GPP2 A.S0016-0—Interoperability Specification (IOS) for CDMA 2000 Access Network Interfaces—Part 6 (A8 and A9 Interfaces); Revision 0 (3G IOSv4.2)," Nov. 16, 2001, Version 1.0, 3GPP2, Arlington, Virginia.

(Continued)

*Primary Examiner* — Ayaz Sheikh
*Assistant Examiner* — Venkatesh Haliyur
(74) *Attorney, Agent, or Firm* — Leydig, Voit & Mayer, Ltd.

(57) ABSTRACT

Methods, devices and apparatus are provided for differentiating operators in a wireless communications network. Information about the frequency occupied by the air interface resource of a service is received, and corresponding operator information is provided from the configured mapping relation between frequency information and operator information according to the received information about the frequency occupied by the air interface resource of the service. A Base Station Controller (BSC)/Packet Control Function (PCF), and a device and system for differentiating operators in a network for performing the above functions is also provided.

17 Claims, 7 Drawing Sheets

U.S. PATENT DOCUMENTS

| | | | |
|---|---|---|---|
| 7,660,595 B2* | 2/2010 | Ramaswamy et al. | 455/502 |
| 7,668,518 B2* | 2/2010 | Chen | 455/166.2 |
| 7,668,545 B2* | 2/2010 | Dyck et al. | 455/436 |
| 7,688,760 B2* | 3/2010 | Xu et al. | 370/255 |
| 7,843,878 B2* | 11/2010 | Morales et al. | 370/331 |
| 7,881,725 B2* | 2/2011 | Rong et al. | 455/453 |
| 7,885,239 B1* | 2/2011 | Oroskar et al. | 370/336 |
| 8,032,139 B2* | 10/2011 | Oommen et al. | 455/435.2 |
| 8,055,266 B1* | 11/2011 | Sarkar et al. | 455/452.1 |
| 8,060,083 B2* | 11/2011 | Malosh | 455/431 |
| 8,081,968 B2* | 12/2011 | Lauer et al. | 455/430 |
| 8,081,969 B2* | 12/2011 | Lauer et al. | 455/431 |
| 8,107,961 B1* | 1/2012 | Vargantwar et al. | 455/436 |
| 8,160,024 B1* | 4/2012 | Ghaus et al. | 370/331 |
| 2002/0067707 A1* | 6/2002 | Morales et al. | 370/331 |
| 2002/0191572 A1* | 12/2002 | Weinstein et al. | 370/338 |
| 2003/0067935 A1* | 4/2003 | Hosein | 370/437 |
| 2004/0158646 A1* | 8/2004 | Miernik et al. | 709/249 |
| 2005/0036504 A1* | 2/2005 | Joshi et al. | 370/441 |
| 2005/0107084 A1* | 5/2005 | Dyck et al. | 455/436 |
| 2005/0246417 A1* | 11/2005 | Raith et al. | 709/203 |
| 2006/0023668 A1* | 2/2006 | Ramaswamy et al. | 370/335 |
| 2006/0046644 A1* | 3/2006 | Chung et al. | 455/11.1 |
| 2006/0126556 A1* | 6/2006 | Jiang et al. | 370/328 |
| 2006/0268840 A1* | 11/2006 | Xu et al. | 370/352 |
| 2007/0032238 A1* | 2/2007 | Kim et al. | 455/436 |
| 2007/0218913 A1* | 9/2007 | Chen | 455/450 |
| 2007/0280264 A1* | 12/2007 | Milton et al. | 370/395.31 |
| 2008/0004031 A1* | 1/2008 | Rong et al. | 455/452.1 |
| 2008/0182573 A1* | 7/2008 | Lauer et al. | 455/431 |
| 2008/0305762 A1* | 12/2008 | Malosh | 455/404.1 |
| 2010/0022243 A1* | 1/2010 | Oommen et al. | 455/435.3 |
| 2010/0220659 A1* | 9/2010 | Luo | 370/328 |
| 2010/0248739 A1* | 9/2010 | Westerberg et al. | 455/453 |

OTHER PUBLICATIONS

"3GPP2 A.S0017-0—Interoperability Specification (IOS) for CDMA 2000 Access Network Interfaces—Part 7 (A10 and A11 Interfaces); Revision 0 (3G IOSv4.2)," Nov. 16, 2001, Version 1.0, 3GPP2, Arlington, Virginia.

"3GPP2 A.S0017-D v3.0—Interoperability Specification (IOS) for CDMA 2000 Access Network Interfaces—Part 7 (A10 and A11 Interfaces); (3G-IOS v5.1.2)," May 2011, Version 3.0, 3GPP2, Arlington, Virginia.

International Search Report in corresponding International Patent Application No. PCT/CN2008/072938 (Feb. 12, 2009).

Written Opinion of the International Searching Authority in corresponding International Patent Application No. PCT/CN2008/072938 (Feb. 12, 2009).

* cited by examiner

METHOD, DEVICE AND SYSTEM FOR DIFFERENTIATING OPERATORS IN ONE NETWORK

CROSS-REFERENCE TO RELATED APPLICATIONS

This application is a continuation of International Application No. PCT/CN2008/072938 filed on Nov. 4, 2008, which claims priority to Chinese Patent Application No. 200710166106.9, filed on Nov. 7, 2007, both of which are hereby incorporated by reference in their entireties.

FIELD OF THE INVENTION

The present invention relates to wireless communication technologies, and in particular, to a method, device, and system for differentiating operators in a network.

BACKGROUND OF THE INVENTION

The telecom authority in some countries requires two operators to operate one wireless communication network jointly to ensure competition. For example, two operators operate a Code Division Multiple Access (CDMA) network jointly. That is, in a CDMA network, two operators operate two different carrier frequencies, and the two operators share the parts of the system except the carrier frequency. The shared parts include: the Base Transceiver Station (BTS), Base Station Controller (BSC), Packet Control Function (PCF), Mobile Switching Center (MSC), and Packet Data Serving Node (PDSN). The MSC is applicable to Circuit Switched (CS) voice services. The BSC is applicable to CS voice services, and outputs an Assignment Complete message or a Layer-3 Call Management (CM) Service Request message that carries the CS voice service information to the MSC. The MSC creates charging information according to the CS voice service information sent by the BSC. The PCF is applicable to Packet Switched (PS) data services, and outputs the PS data service information to the PDSN. The PDSN supports the transmission of packet data to the Internet/Intranet, works as an interface between the Radio Access Network (RAN) and the Packet Data Network (PDN), serves as a packet data access gateway, and creates PS data service charging information through the terminal user data recorded in the Packet Routing Function (PRF) and the A11-Registration Request message sent in the PCF. The terminal user enjoys the services of two carrier frequencies through the carrier frequencies operated by the two operators.

In practice, the BSC and the PCF may be combined into a BSC/PCF, or set separately.

When the terminal user enjoys the services of two carrier frequencies, the charging information generated by at least one of the MSC and the PDSN needs to be differentiated according to operations to facilitate charge settlement between the operators. However, in the existing CDMA protocol, the MSC or the PDSN is unable to differentiate the operator information of different operators in a network, and does not support separate charge settlement according to different operator information.

SUMMARY OF THE INVENTION

An aspect of the present invention provides a method for differentiating operators in a network to identify different operator information in a network and to enable settlement between operators.

Another aspect of the present invention provides a device for differentiating operators in a network to identify different operator information in a network and to enable settlement between operators.

Further another aspect of the present invention provides a system for differentiating operators in a network to identify different operator information in a network and to enable settlement between operators.

Methods, devices and systems are provided for differentiating operators in a network in which mapping relations between frequency information and operator information can be preconfigured at the MSC and/or PDSN, in which case the BSC/PCF notifies the information about the frequency occupied by the air interface resource of a service to at least one of the MSC and the PDSN, and at least one of the MSC and the PDSN obtains the corresponding operator information according to the information about the frequency occupied by the air interface resource of the service as well as the configured mapping relations between the frequency information and the operator information. If the mapping relations between the frequency information and the operator information are configured at the BSC/PCF, the BSC/PCF queries the corresponding operator information according to the information about the frequency occupied by the air interface resource of the service as well as the configured mapping relations between the frequency information and the operator information, and sends the operator information to the MSC and/or PDSN. The MSC and/or the PDSN differentiates operators in a network, meets the requirement of settlement between operators, and implements frequency-specific operation of the system.

In one aspect of the invention, a method is provided for differentiating operators in a network. The method includes receiving information about a frequency occupied by an air interface resource of a service, and querying corresponding operator information from configured mapping relation between frequency information and operator information according to the received information about the frequency occupied by the air interface resource of the service.

In another aspect of the invention, a base station controller/packet control function ("BSC/PCF") includes an information receiving unit, configured to receive information about a frequency occupied by an air interface resource of a service, and an information processing unit, configured to query corresponding operator information from configured mapping relation between frequency information and operator information according to the information about the frequency occupied by the air interface resource of the service, where the frequency information is received by the information receiving unit.

A further aspect of the invention provides a device for differentiating operators in a network. The device includes an information receiving unit, configured to receive information about a frequency occupied by an air interface resource of a service from a BSC/PCF, and send the information to an information processing unit. The information processing unit is configured to query corresponding operator information from the configured mapping relation between frequency information and operator information according to the received information about the frequency occupied by the air interface resource of the service.

In a further aspect of the invention, there is provided a system for differentiating operators in a network includes. The system includes a BSC/PCF, configured to: send received information about a frequency occupied by an air interface resource of a CS voice service to an MSC, or query operator information from the configured mapping relation between frequency information and operator information according to the information about the frequency occupied by the air interface resource of the CS voice service and send found operator information to the MSC; and the MSC, configured to receive the operator information sent by the BSC/PCF, or query the operator information from the configured mapping relation between the frequency information and the operator information according to the received information about the frequency occupied by the air interface resource of the CS voice service.

A system for differentiating operators in a network includes:

a BSC/PCF, configured to: send received information about a frequency occupied by an air interface resource of a PS data service to a PDSN, or query operator information from the configured mapping relation between frequency information and operator information according to the information about the frequency occupied by the air interface resource of the PS data service and send found operator information to the PDSN; and the PDSN, configured to receive the operator information sent by the BSC/PCF, or query the operator information from the configured mapping relation between the frequency information and the operator information according to the received information about the frequency occupied by the air interface resource of the PS data service.

BRIEF DESCRIPTION OF THE DRAWINGS

To illustrate the technical solution according to the embodiments of the present invention or in the prior art more clearly, the accompanying drawings for describing the embodiments or the prior art are introduced briefly below. Apparently, the accompanying drawings in the following description are only some exemplary embodiments of the present invention, and persons of ordinary skill in the art can derive other drawings from the accompanying drawings without creative efforts.

DETAILED DESCRIPTION OF THE EMBODIMENTS

In order to make the technical solution, objectives and merits of the present invention clearer, the present invention is hereinafter described in detail with reference to accompanying drawings and some exemplary embodiments.

For ease of description, the following description takes a CDMA 2000 system as an example. It is understandable that the present invention is applicable not only to the CDMA 2000, but also to the narrowband CDMA (Q-CDMA), wideband CDMA (W_CDMA), Time Division-Synchronous CDMA (TD-SCDMA) and other wireless communication systems such as the Global System for Mobile Communications (GSM), General Packet Radio Service (GPRS), WiMAX, and Long Term Evolution (LTE) system. In such systems, the message for carrying the operator-related information (including operator information or information about the frequency occupied by the air interface resource of the service) differs accordingly. In the embodiments of the present invention, the message name is suitable for application in the CDMA system. For application in the GSM system, the message name of the CS voice service is the same; for application in the WCDMA system, the message name is different from that in the embodiments of the present invention. In the embodiments of the present invention, the BSC/PCF may be replaced with any access network device directly, and the MSC may be replaced with any suitable core network device.

In the embodiments of the present invention, if mapping relations between frequency information and operator information are preconfigured on at least one of the MSC and the PDSN, the BSC/PCF notifies the information about the frequency occupied by the air interface resource of a service to at least one of the MSC and the PDSN, and at least one of the MSC and the PDSN obtains the corresponding operator information according to the information about the frequency occupied by the air interface resource of the service as well as the configured mapping relations between the frequency information and the operator information. In another embodiment of the present invention, if the mapping relations between the frequency information and the operator information are configured at the BSC/PCF, the BSC/PCF queries the corresponding operator information according to the information about the frequency occupied by the air interface resource of the service as well as the configured mapping relations between the frequency information and the operator information, and sends the operator information to at least one of the MSC and the PDSN.

To fulfill the foregoing objectives, a system for differentiating operators in a network is put forward in the first embodiment of the present invention.

Figure 1:
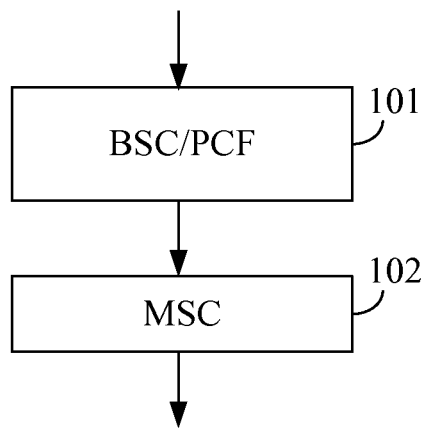
FIG. 1 is a simple schematic diagram illustrating a system for differentiating operators in a network according to a first embodiment of the present invention.

FIG. 1 is a simple schematic diagram illustrating a system for differentiating operators in a network according to the first embodiment of the present invention. As shown in FIG. 1, the system includes a BSC/PCF 101 and an MSC 102.

The BSC/PCF 101 is configured to: send received information about a frequency occupied by an air interface resource of a CS voice service to the MSC 102, or query operator information from the configured mapping relation between frequency information and operator information according to the information about the frequency occupied by the air interface resource of the CS voice service and send the found operator information to the MSC 102.

The MSC 102 is configured to receive the operator information sent by the BSC/PCF 101, or query the operator information from the configured mapping relation between the frequency information and the operator information according to the received information about the frequency occupied by the air interface resource of the CS voice service.

In practice, taking the CDMA network as an example, the system provided herein includes:

a BSC/PCF, configured to: receive information about a frequency occupied by an air interface resource of a CS voice service, and notify the information to an MSC; or query operator information according to preconfigured mapping relations between the frequency information and the operator information and according to the received information about the frequency occupied by the air interface resource of the CS voice service, and notify the found operator information to the MSC; receive the information about the frequency occupied by the air interface resource of a PS data service, and notify the information to the PDSN through a PCF; or query the operator information according to the preconfigured mapping relations between the frequency information and the operator information and according to the received information about the frequency occupied by the air interface resource of the PS data service, and notify the found operator information to the PDSN through the PCF; and the MSC, configured to: receive the information sent by the BSC/PCF; and, if the received information is operator information, organize and output charging information according to the operator information; or, if the received information is the information about the frequency occupied by the air interface resource of the CS voice service, query the operator information according to the preconfigured mapping relations between the frequency information and the operator information, and organize and output the charging information according to the found operator information.

Figure 2:
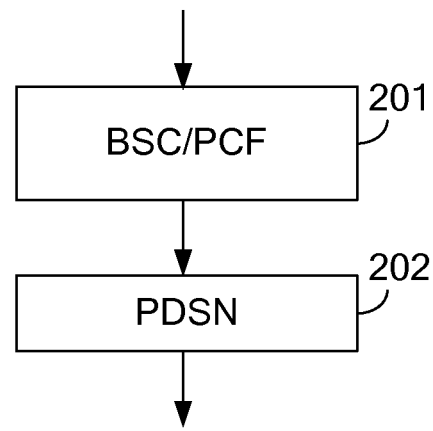
FIG. 2 is a simple schematic diagram illustrating a system for differentiating operators in a network according to a second embodiment of the present invention.

FIG. 2 is a simple schematic diagram illustrating another system for differentiating operators in a network according to the second embodiment of the present invention. As shown in FIG. 2, the system includes a BSC/PCF 201 and a PDSN 202.

The BSC/PCF 201 is configured to: send received information about a frequency occupied by an air interface resource of a PS data service to the PDSN 202, or query operator information from the configured mapping relation between frequency information and operator information according to the information about the frequency occupied by the air interface resource of the PS data service, and send found operator information to the PDSN 202.

The PDSN 202 is configured to receive the operator information sent by the BSC/PCF 201, or query the operator information from the configured mapping relation between the frequency information and the operator information according to the received information about the frequency occupied by the air interface resource of the PS data service.

In practice, taking the CDMA network as an example, the system provided herein includes:

a BSC/PCF, configured to: receive information about a frequency occupied by an air interface resource of a PS data service, and notify the information to the PDSN through a PCF; or query operator information according to preconfigured mapping relations between frequency information and operator information and according to the received information about the frequency occupied by the air interface resource of the PS data service, and send the found operator information to the PDSN through the PCF; and the PDSN, configured to: receive the information sent by the BSC/PCF; and, if the received information is operator information, organize and output charging information according to the operator information; or, if the received information is the information about the frequency occupied by the air interface resource of the PS data service, query the operator information according to the preconfigured mapping relations between the frequency information and the operator information, and organize and output the charging information according to the found operator information.

Figure 3:
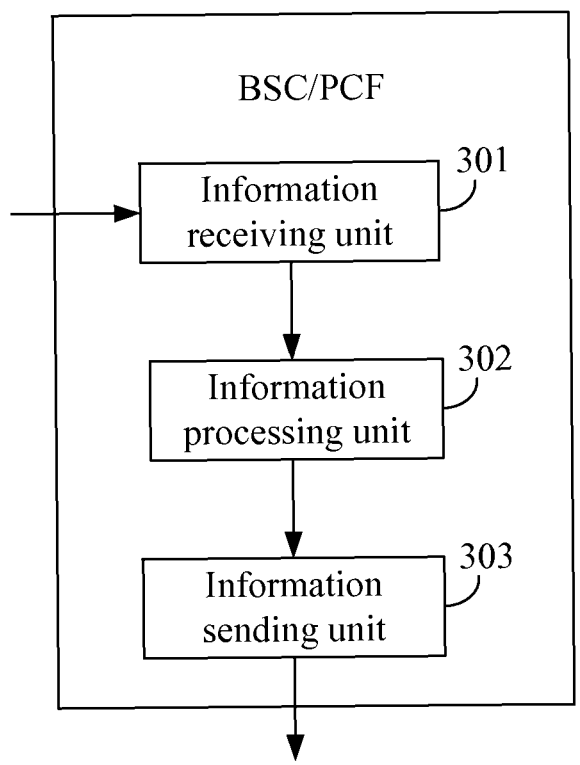
FIG. 3 is a simple schematic diagram illustrating a BSC/PCF according to a third embodiment of the present invention.

FIG. 3 is a simple schematic diagram illustrating a BSC/PCF provided according to the third embodiment of the present invention. The BSC/PCF includes: an information receiving unit 301, an information processing unit 302, and an information sending unit 303.

The information receiving unit 301 is configured to receive information about a frequency occupied by an air interface resource of a service from the outside, and send the information to the information processing unit 302.

For example, the information about the frequency occupied by the air interface resource of the service includes the information about the frequency occupied by the air interface resource of a CS voice service and the information about the frequency occupied by the air interface resource of a PS data service.

The information processing unit 302 is configured to: after the information receiving unit 302 receives the information about the frequency occupied by the air interface resource of the service, send the information to the information sending unit; or query operator information according to configured mapping relations between frequency information and operator information and according to the information about the frequency occupied by the air interface resource of the service, and send the found operator information to the information sending unit.

For the CS voice service, for example, if the service is in a CDMA 2000 system, the BSC adds one of the information about the frequency occupied by the air interface resource and the operator information to one of an Assignment Complete message and a CM Service Request message. For the PS data service, the BSC adds one of the information about the frequency occupied by the air interface resource and the operator information to an A9-Setup A8 message. The PCF receives the A9-Setup A8 message, and obtains one of the information about the frequency occupied by the air interface resource and the operator information from the A9-Setup A8 message, and adds such information to an A11-Registration Request message.

The BSC/PCF device further includes:

an information sending unit 303, configured to receive information about the frequency occupied by the air interface resource of the service from the information processing unit 202 or receive the found operator information queried by the information processing unit 202, and send the received information to at least one of the MSC and the PDSN.

Figure 4:
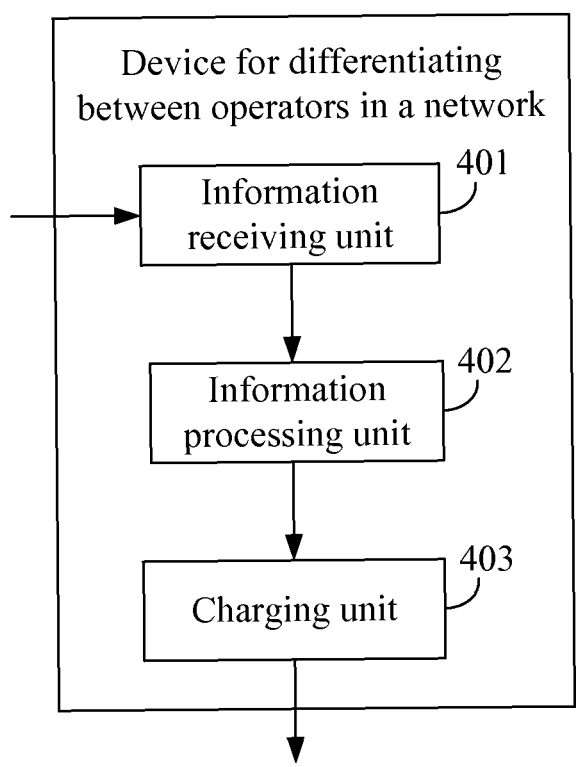
FIG. 4 is a simple schematic diagram illustrating an MSC according to a fourth embodiment of the present invention.

FIG. 4 is a simple schematic diagram illustrating a device for differentiating between operators in a network according to the fourth embodiment of the present invention. The device includes: an information receiving unit 401, an information processing unit 402, and a charging unit 403. Supposing that the device is an MSC, the units of the device are described below.

The information receiving unit 401 is configured to: receive information about the frequency occupied by the air interface resource of a CS voice service from a BSC/PCF or receive operator information, and send the received information to the information processing unit 402.

For example, the information about the frequency occupied by the air interface resource of the service includes the information about the frequency occupied by the air interface resource of a CS voice service and the information about the frequency occupied by the air interface resource of a PS data service. In a CDMA 2000 system, if the information about the frequency occupied by the air interface resource of the service is the information about the frequency occupied by the air interface resource of a CS voice service, the information about the frequency occupied by the air interface resource of the CS voice service or the operator information may be carried in an Assignment Complete message or a CM Service Request message.

The information processing unit 402 is configured to: receive the information sent by the information receiving unit 401; and, if the information sent by the information receiving unit 401 is the information about the frequency occupied by the air interface resource of a CS voice service, query the operator information according to preconfigured mapping relations between the frequency information and the operator information.

Therefore, the information processing unit 402 is further configured to organize and output charging information according to the found or received operator information. That is, in practice, the information processing unit is further configured to organize and output charging information to the charging unit according to the found or received operator information.

Accordingly, the device provided in this embodiment further includes a charging unit 403, which is configured to receive the charging information output by the information processing unit 402 and perform charging.

The device for differentiating operators in a network in this embodiment may be an MSC or a PDSN. In practice, the PDSN structure is similar to the structure shown in FIG. 3. Unlike FIG. 3, the information receiving unit receives the information about the frequency occupied by the air interface resource of a PS data service or receives operator information, and other units perform operations according to the information about the frequency occupied by the air interface resource of the PS data service or operator information.

In the CDMA 2000 system, the CS voice service and the PS data service coexist. The MSC processes the CS voice service, and the PDSN processes the PS data service. Therefore, the method for differentiating operators in a network is different for both services, and is described below separately.

For the CS voice service, in the CS voice service process, the Assignment Complete message or a CM Service Request message sent by the BSC/PCF to the MSC carries operator information, and the operator information corresponding to the information about the frequency occupied by the air interface resource of the CS voice service is notified to the MSC so that the MSC can output the charging information according to the operator information.

Figure 5:
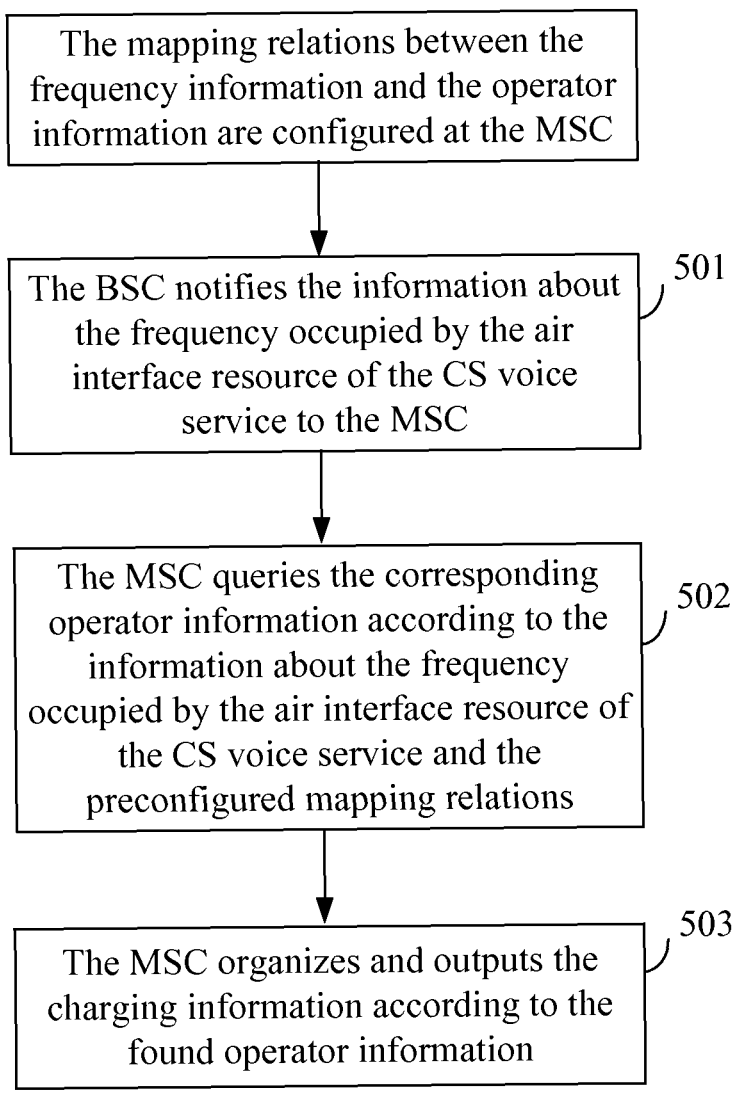
FIG. 5 is a simple schematic diagram illustrating a method for differentiating operators in a network according to a fifth embodiment of the present invention.

FIG. 5 is a simple schematic diagram illustrating a method for differentiating operators in a network according to the fifth embodiment of the present invention. As shown in FIG. 5, the mapping relations between the frequency information and the operator information are preconfigured at the MSC, and the method includes the following contents Block 501: In the CS voice service process, the BSC/PCF notifies the information about the frequency occupied by the air interface resource of the CS voice service to the MSC.

For example, the BSC/PCF adds the information about the frequency occupied by the air interface resource of the CS voice service to one of an Assignment Complete message and a CM Service Request message, and sends the message carrying the information about the frequency occupied by the air interface resource of the CS voice service to the MSC.

Block 502: The MSC queries the corresponding operator information according to the received information about the frequency occupied by the air interface resource of the CS voice service and the preconfigured mapping relations between frequency information and operator information.

In this block, after the MSC obtains the corresponding operator information, different operators in a network can be differentiated. In the subsequent process, the charge is settled for different operators according to the operator information, and the process proceeds to block 503.

Block 503: The MSC finds the operator information, and organizes and outputs the charging information according to the found operator information.

For example, the mapping relations between the frequency information and the operator information may be configured at the BSC/PCF, and the BSC/PCF queries the corresponding operator information according to the information about the frequency occupied by the air interface resource of the CS voice service and the configured mapping relations between the frequency information and the operator information, and adds the operator information to an Assignment Complete message or a CM Service Request message.

Figure 6:
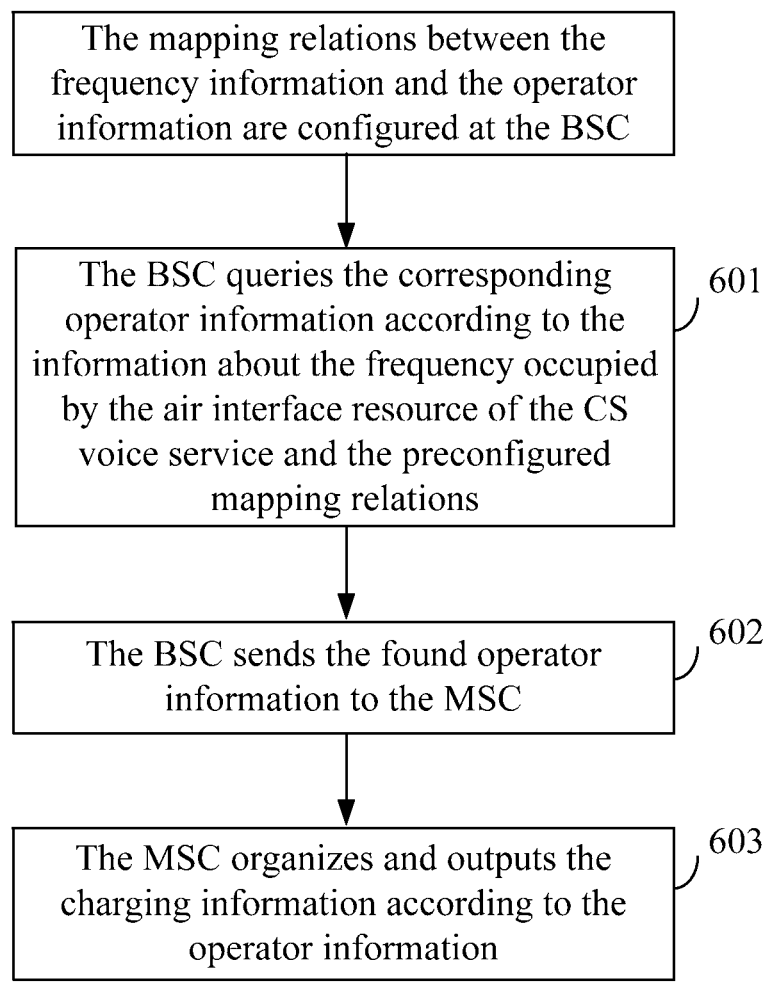
FIG. 6 is a simple schematic diagram illustrating a method for differentiating operators in a network according to a sixth embodiment of the present invention.

FIG. 6 is a simple schematic diagram illustrating a method for differentiating operators in a network according to the sixth embodiment of the present invention. As shown in FIG. 6, the mapping relations between the frequency information and the operator information are configured at the BSC/PCF, and the method includes the following contents.

Block 601: In the CS voice service process, the BSC/PCF queries the corresponding operator information according to the information about the frequency occupied by the air interface resource of the CS voice service and the configured mapping relations between frequency information and operator information.

Block 602: The BSC/PCF sends the found operator information to the MSC.

In this block, the BSC/PCF adds the found operator information to an Assignment Complete message or a CM Service Request message.

Block 603: The MSC organizes and outputs the charging information according to the operator information.

For example, the MSC organizes and outputs the charging information according to the operator information carried in the Assignment Complete message or CM Service Request message.

In the foregoing embodiment, if the mapping relations between frequency information and operator information are configured at the MSC, the BSC/PCF notifies the information about the frequency occupied by the air interface resource of the CS voice service to the MSC, and the MSC obtains the operator information according to the information about the frequency occupied by the air interface resource of the CS voice service as well as the configured mapping relations between the frequency information and the operator information, and organizes and outputs the charging information; or if the mapping relations between the frequency information and the operator information are configured at the BSC/PCF, the BSC/PCF queries the operator information according to the information about the frequency occupied by the air interface resource of the CS voice service as well as the configured mapping relations between the frequency information and the operator information, and sends the operator information to the MSC, and the MSC organizes and outputs the charging information. In this way, the operators in a network are differentiated from one another, and the CS voice service charging information can be output according to different operator information.

Figure 7:
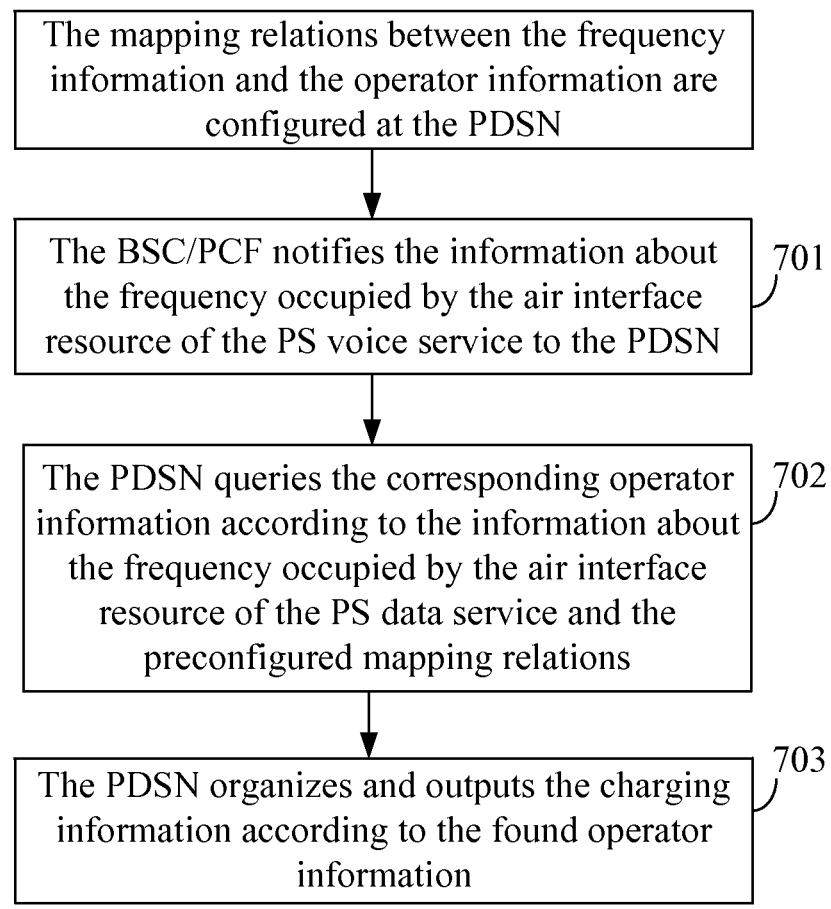
FIG. 7 is a simple schematic diagram illustrating a method for differentiating operators in a network according to a seventh embodiment of the present invention.

The foregoing description takes the CS voice service as an example. For the PS data service, in the PS data service process, the operator information is added to the A11-Registration Request message sent by the BSC/PCF to the PDSN, and the PDSN receives the A11-Registration Request message and outputs the PS data service charging information according to the carried operator information, as detailed below:

FIG. 7 is a simple schematic diagram illustrating a method for differentiating operators in a network according to the seventh embodiment of the present invention. In this embodiment, the BSC/PCF adds the information about the frequency occupied by the air interface resource of the PS data service to the A11-Registration Request message, and sends the A11-Registration Request message to the PDSN; and the PDSN outputs the charging information according to the frequency information. As shown in FIG. 6, the mapping relations between the frequency information and the operator information are configured at the PDSN, and the process includes the following contents.

Block 701: In the PS data service process, the BSC/PCF notifies the information about the frequency occupied by the air interface resource of the PS data service to the PDSN.

For example, the BSC/PCF adds the information about the frequency occupied by the air interface resource of the PS data service to an A11-Registration Request message, and sends the A11-Registration Request message to the PDSN.

Block 702: The PDSN queries the corresponding operator information according to the received information about the frequency occupied by the air interface resource of the PS data service and the configured mapping relations between frequency information and operator information;

Block 703: The PDSN finds the operator information, and organizes and outputs the charging information according to the found operator information.

In practice, the mapping relations between the frequency information and the operator information may be configured at the BSC/PCF, and the BSC/PCF queries the corresponding operator information according to the information about the frequency occupied by the air interface resource of the PS data service and the configured mapping relations between the frequency information and the operator information, and adds the operator information to the A11-Registration Request message.

Figure 8:
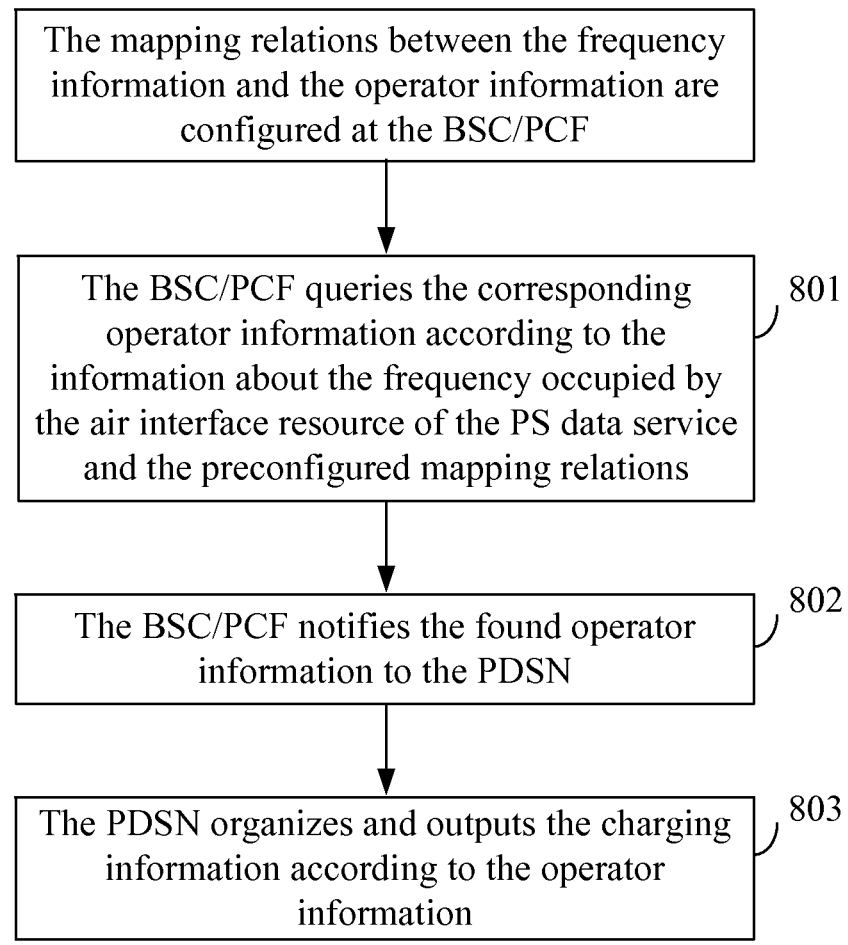
FIG. 8 is a simple schematic diagram illustrating a method for differentiating operators in a network according to an eighth embodiment of the present invention.

FIG. 8 is a simple schematic diagram illustrating a method for differentiating between operators in a network according to the eighth embodiment of the present invention. As shown in FIG. 8, the mapping relations between the frequency information and the operator information are configured at the BSC/PCF, and the process includes the following contents.

Block 801: In the PS data service process, the BSC/PCF queries the corresponding operator information according to the information about the frequency occupied by the air interface resource of the PS data service and the configured mapping relations between frequency information and operator information.

Block 802: The BSC/PCF notifies the found operator information to the PDSN.

For example, the BSC/PCF adds the found operator information to the A11-Registration Request message and sends the A11-Registration Request message to the PDSN.

Block 803: The PDSN organizes and outputs the charging information according to the operator information.

For example, the operator information is carried in an A11-Registration Request message.

In the above embodiment, if the mapping relations between frequency information and operator information are configured on at least one of the MSC and the PDSN, the BSC/PCF notifies the information about the frequency occupied by the air interface resource of a service to at least one of the MSC and the PDSN, and at least one of the MSC and the PDSN obtains the corresponding operator information according to the information about the frequency occupied by the air interface resource of the service as well as the configured mapping relations between the frequency information and the operator information, and organizes and outputs the charging information; or if the mapping relations between the frequency information and the operator information are configured at the BSC/PCF, the BSC/PCF queries the corresponding operator information according to the information about the frequency occupied by the air interface resource of the service as well as the configured mapping relations between the frequency information and the operator information, and sends the operator information to at least one of the MSC and the PDSN, and at least one of the MSC and the PDSN organizes and outputs the charging information. At least one of the MSC and the PDSN differentiates operators in a network, and implements frequency-specific operation of the system.

The word "receive" herein refers to obtaining information from other modules actively or receiving information sent by other modules.

It is understandable to those skilled in the art that the accompanying drawings are for illustrating the exemplary embodiments only, and the modules or flowcharts in the accompanying drawings are not mandatory.

In addition, the modules in the apparatuses in the embodiments of the present invention may be distributed in the apparatuses in the way described herein, or distributed in other ways, for example, in one or more other apparatuses. The modules in the foregoing embodiments may be combined into one, or split into several submodules.

The serial number of the embodiments given above is for clear description only, and does not represent the order of preference.

Some of the blocks involved in the embodiments of the present invention may be implemented by software. The software program may be stored in a readable storage medium such as a hard disk or a Compact Disk (CD).

Detailed above are the objectives, technical solution and merits of the present invention. Although the invention has been described through several exemplary embodiments, the invention is not limited to such embodiments. Any modification, equivalent replacement, or improvement made without departing from the spirit and principle of the present invention should fall within the scope of the present invention.

What is claimed is:

1. A method for differentiating operators in a network, comprising:

receiving information about a frequency occupied by an air interface resource of a service; and querying corresponding operator information from configured mapping relation between frequency information and operator information according to the received information about the frequency occupied by the air interface resource of the service;

wherein the mapping relation between the frequency information and the operator information is configured at a mobile switching center (MSC), and the querying of the corresponding operator information comprises:

querying, by the MSC, the corresponding operator information from the configured mapping relation between the frequency information and the operator information according to information about a frequency occupied by an air interface resource of a circuit switched (CS) voice service from a base station controller (BSC)/packet control function (PCF); or wherein the mapping relation between the frequency information and the operator information is configured at a packet data serving node (PDSN), and the querying of the corresponding operator information comprises:

querying, by the PDSN, the corresponding operator information from the configured mapping relation between the frequency information and the operator information according to information about a frequency occupied by an air interface resource of a packet switched (PS) data service from a base station controller (BSC)/packet control function (PCF).

2. The method of claim 1, wherein the mapping relation between the frequency information and the operator information is configured at a Base Station Controller (BSC)/Packet Control Function (PCF), and the querying of the corresponding operator information comprises:
querying, by the BSC/PCF, the corresponding operator information from the configured mapping relation between the frequency information and the operator information according to the received information about the frequency occupied by the air interface resource of the service.

3. The method of claim 2, wherein the information about the frequency occupied by the air interface resource of the service comprises at least one of the information about a frequency occupied by an air interface resource of a Circuit Switched (CS) voice service and the information about a frequency occupied by an air interface resource of a Packet Switched (PS) data service, and the method further comprises:
sending, by the BSC/PCF, found operator information to one of a Mobile Switching Center (MSC) and a Packet Data Serving Node (PDSN).

4. The method of claim 3, wherein when the information about the frequency occupied by the air interface resource of the service is the information about the frequency occupied by the air interface resource of the CS voice service, the method further comprises:
adding the found operator information to one of an Assignment Complete message and a Call Management (CM) Service Request message, and sending the message carrying the found operator information to the MSC.

5. The method of claim 3, wherein when the information about the frequency occupied by the air interface resource of the service is the information about the frequency occupied by the air interface resource of the PS data service, the method further comprises:
adding the found operator information to an A11-Registration Request message, and sending the A11-Registration Request message to the PDSN.

6. The method of claim 1, further comprising:
Organizing and outputting charging information according to the operator information.

7. A Base Station Controller (BSC)/Packet Control Function (PCF), comprising:
an information receiving unit, configured to receive information about a frequency occupied by an air interface resource of a service; and
an information processing unit, configured to query corresponding operator information from configured mapping relation between frequency information and operator information according to the information about the frequency occupied by the air interface resource of the service, wherein the frequency information is received by the information receiving unit;
wherein the mapping relation between the frequency information and the operator information is configured at a mobile switching center (MSC), and the MSC queries the corresponding operator information from the configured mapping relation between the frequency information and the operator information according to information about a frequency occupied by an air interface resource of a circuit switched (CS) voice service from a base station controller (BSC)/packet control function (PCF); or
wherein the mapping relation between the frequency information and the operator information is configured at a packet data serving node (PDSN), and the PDSN queries the corresponding operator information from the configured mapping relation between the frequency information and the operator information according to information about a frequency occupied by an air interface resource of a packet switched (PS) data service from a base station controller (BSC)/packet control function (PCF).

8. The BSC/PCF of claim 7, wherein the BSC/PCF further comprises: an information sending unit, configured to send the operator information found by the information processing unit to at least one of a Mobile Switching Center (MSC) and a Packet Data Serving Node (PDSN).

9. A device for differentiating operators in a network, comprising:
an information receiving unit, configured to receive information about a frequency occupied by an air interface resource of a service from a Base Station Controller (BSC)/Packet Control Function (PCF), and send the information to an information processing unit; and
the information processing unit, configured to: query corresponding operator information from configured mapping relation between frequency information and operator information according to the received information about the frequency occupied by the air interface resource of the service;
wherein:
the information receiving unit is further configured to receive the operator information and send the operator information to the information processing unit;
the information processing unit is further configured to organize and output charging information according to at least one of the found operator information and the received operator information; and
the device further comprises: a charging unit configured to receive the charging information output by the information processing unit and perform charging.

10. The device of claim 9, wherein the device is one of a Mobile Switching Center (MSC) and a Packet Data Serving Node (PDSN).

11. The device of claim 9, wherein if the received information about the frequency occupied by the air interface resource of the service is the information about the frequency occupied by the air interface resource of a circuit switching (CS) voice service, one of the information about the frequency occupied by the air interface resource of the CS voice service and the operator information is carried in one of an Assignment Complete message and a call management (CM) Service Request message.

12. The BSC/PCF of claim 7, wherein, for circuit switching (CS) voice service, one of the information about the frequency occupied by the air interface resource and the operator information is carried in one of an Assignment Complete message and a call management (CM) Service Request message.

13. The BSC/PCF of claim 7, wherein, for packet switched (PS) data service, one of the information about the frequency occupied in the air interface resource and the operator information is carried by an A9-Setup A8 message.

14. The method of claim 1, further comprising;
adding, by the BSC/PCF, the information about the frequency occupied by the air interface resource of the PS data service to an A11-Registration Request message, and sending the A11-Registration Request message to the PDSN.

15. The method of claim 1, further comprising:
adding, by the BSC/PCF, the information about the frequency occupied by the air interface resource of the Circuit Switched voice service to an Assignment Complete message.

16. The method of claim 1, further comprising:
adding, by the BSC/PCF, the information about the frequency occupied by the air interface resource of the Circuit Switched voice service to a call management (CM) Service Request message.

17. A non-transitory machine-readable medium having stored thereon, a computer program comprising at least one code section for distributing data, the at least one code section being executable by a machine for causing the machine to perform acts of:
querying corresponding operator information from configured mapping relation between frequency information and operator information according to the received information about the frequency occupied by the air interface resource of the service;
wherein the mapping relation between the frequency information and the operator information is configured at a mobile switching center (MSC), and the querying of the corresponding operator information comprises:
querying, by the MSC, the corresponding operator information from the configured mapping relation between the frequency information and the operator information according to information about a frequency occupied by an air interface resource of a circuit switched (CS) voice service from a base station controller (BSC)/packet control function (PCF); or
wherein the mapping relation between the frequency information and the operator information is configured at a packet data serving node (PDSN), and the querying of the corresponding operator information comprises:
querying, by the PDSN, the corresponding operator information from the configured mapping relation between the frequency information and the operator information according to information about a frequency occupied by an air interface resource of a packet switched (PS) data service from a base station controller (BSC)/packet control function (PCF).

* * * * *